(12) United States Patent
Coscarelli et al.

(10) Patent No.: US 11,321,083 B2
(45) Date of Patent: May 3, 2022

(54) AUTOMATED BRANCHING WORKFLOW FOR A VERSION CONTROL SYSTEM

(71) Applicant: THE TORONTO-DOMINION BANK, Toronto (CA)

(72) Inventors: Lorenzo Coscarelli, Toronto (CA); Michel Buczynski, Toronto (CA); Joseph Vincent Scarfutti, New York, NY (US)

(73) Assignee: The Toronto-Dominion Bank, Toronto (CA)

( * ) Notice: Subject to any disclaimer, the term of this patent is extended or adjusted under 35 U.S.C. 154(b) by 74 days.

(21) Appl. No.: 16/793,996

(22) Filed: Feb. 18, 2020

(65) Prior Publication Data

US 2021/0255854 A1 Aug. 19, 2021

(51) Int. Cl.
*G06F 8/71* (2018.01)
*G06Q 10/10* (2012.01)
*G06F 11/36* (2006.01)
*G06F 8/30* (2018.01)

(52) U.S. Cl.
CPC .................. *G06F 8/71* (2013.01); *G06F 8/30* (2013.01); *G06F 11/362* (2013.01);
(Continued)

(58) Field of Classification Search
CPC . G06F 8/71; G06F 8/30; G06F 11/362; G06F 11/3688; G06F 11/3692; G06Q 10/10
See application file for complete search history.

(56) References Cited

U.S. PATENT DOCUMENTS 6,415,299 B1\* 7/2002 Baisley ..................... G06F 8/71
8,347,272 B2 1/2013 Sugawara et al.
(Continued)

FOREIGN PATENT DOCUMENTS

CN 107678773 A 2/2018
CN 107728996 A 2/2018
(Continued)

OTHER PUBLICATIONS

Atlassian, "Making a Pull Request," Date Unknown, 14 pages, [Online] [Retrieved on Feb. 19, 2020, <URL: https://www.atlassian.com/git/tutorials/making-a-pull-request>.
(Continued)

*Primary Examiner* — Wei Y Zhen
*Assistant Examiner* — Amir Soltanzadeh
(74) *Attorney, Agent, or Firm* — Fenwick & West LLP

(57) ABSTRACT

A traditional version control system workflow for branching and release management is not compatible with development environments that require long release cycles. When a release branch from a long release cycle is merged into a master branch, bug fixes made to the release branch and to the master branch are not merged into the development branch in a timely manner. A version control system automatically merges document versions from the release branch into the development branch when changes are merged into the release branch or the master branch, thus keeping the development current with respect to the release and master branches without formally closing the release branch.

14 Claims, 10 Drawing Sheets

(52) U.S. Cl.
CPC ...... *G06F 11/3688* (2013.01); *G06F 11/3692* (2013.01); *G06Q 10/10* (2013.01)

(56) References Cited

U.S. PATENT DOCUMENTS

| | | | |
|---|---|---|---|
| 9,430,229 | B1 | 8/2016 | Van Zijst et al. |
| 10,067,754 | B2 | 9/2018 | Little et al. |
| 10,185,703 | B2 | 1/2019 | Abrahami |
| 10,204,112 | B1 | 2/2019 | Bhargava et al. |
| 10,311,030 | B1 | 6/2019 | Barnes et al. |
| 10,387,153 | B2 | 8/2019 | Cimadamore et al. |
| 10,606,585 | B1 * | 3/2020 | Safronoff ............ G06F 8/71 |
| 2012/0284693 | A1 * | 11/2012 | Tannous ............ G06F 8/71 717/121 |
| 2013/0144566 | A1 | 6/2013 | De Biswas |
| 2015/0286558 | A1 * | 10/2015 | Bartlow ............ G06F 8/71 717/131 |
| 2016/0378647 | A1 * | 12/2016 | Maeoka ............ G06F 11/3688 717/124 |
| 2018/0150294 | A1 * | 5/2018 | Phillips ............ G06F 8/71 |
| 2019/0129701 | A1 | 5/2019 | Hawrylo et al. |

FOREIGN PATENT DOCUMENTS

| | | |
|---|---|---|
| CN | 108415694 A | 8/2018 |
| CN | 109144562 B | 6/2019 |

OTHER PUBLICATIONS

Daugherty, R., "A Branching and Releasing Strategy That Fits GitHub Flow," Feb. 18, 2016, 20 pages, [Online] [Retrieved on Feb. 19, 2020, <URL: https://hackernoon.com/a-branching-and-releasing-strategy-that-fits-github-flow-be1b6c48eca2>.

GitLab Docs, "Introduction to GitLab Flow," Date Unknown, 17 pages, [Online] [Retrieved on Feb. 19, 2020, <URL: https://docs.gitlab.com/ee/workflow/gitlab flow.html>.

Krusche, S. et al., "Teaching Code Review Management using Branch Based Workflows," 38$^{th}$ International Conference on Software Engineering—ICSE, May 2016, pp. 1-10.

Technology Conversations, "Working With Pull Requests and Preview Environments," Date Unknown, four pages, [Online] [Retrieved on Feb. 19, 2020, <URL: https://technologyconversations.com/2019/03/25/working-with-pull-requests-and-preview-environments/>.

\* cited by examiner

AUTOMATED BRANCHING WORKFLOW FOR A VERSION CONTROL SYSTEM

BACKGROUND

Field of Art

This disclosure relates generally to version control systems and more particularly to automated branching workflows for software version control.

Description of Art

Versioning control systems are used for keeping track of changes in a code project during software development. However, common branching release workflows are not well suited for extended release cycles. One issue with the common release process is that long-lived branches will inevitably create merge conflicts with other branches, such as a development branch. In particular the most common branching workflows are designed to work well within agile development environments that require a release branch to be open for only a short time. A process for ensuring that the development branch stays up-to-date with changes merged into a release branch and a master branch over the course of long release cycles would be beneficial.

SUMMARY

The traditional software development branching and release management process is not compatible with development environments that require long release cycles. When a release branch from a long release cycle is merged into a master (i.e., production) branch, bug fixes made to the release branch and to the master branch are not merged into the development branch in a timely manner. In such cases, a most recent version of a code base or other versioned document system may not be available for further development.

The present system and workflow facilitate automatic merges from the release branch into the development branch when changes (e.g., bugfixes, hotfixes) are merged into the release branch or the master branch, thus keeping the development current with respect to the release and master branches without formally closing the release branch.

Automation within a version control environment that combines pull requests to a master branch with merges back to the development branch makes it more feasible to use a software development release process for developing and releasing code within organizations that require long release cycles (e.g., due to regulatory requirements or quality assurance test parameters).

The version control system supports a workflow that includes automated updates to merge changes to a development branch. The workflow includes storage of the latest versions of development changes to a software project to a development branch. The workflow also supports publication of a version of the software project to a master branch. To ensure that document versions from the development branch are ready to be published while simultaneously facilitating ongoing development, the system prepares a software version for publication at one or more staging branches, separate from the development branch and the master branch. That is, a staging branch may be created using a document version from the development branch and preparatory steps such as bugfixes, quality assurance tests, and regulatory checks can be performed on the software at a staging branch, while development continues separately on the development branch. When a change is made to a document version at a staging branch or at the master branch, the change is also propagated to the development branch so that development continues with the most current and bug-free version of the document.

The features and advantages described in this summary and the following detailed description are not limiting and not all-inclusive. Many additional features and advantages will be apparent to one of ordinary skill in the art in view of the drawings, specification, and claims hereof.

Figure 1:
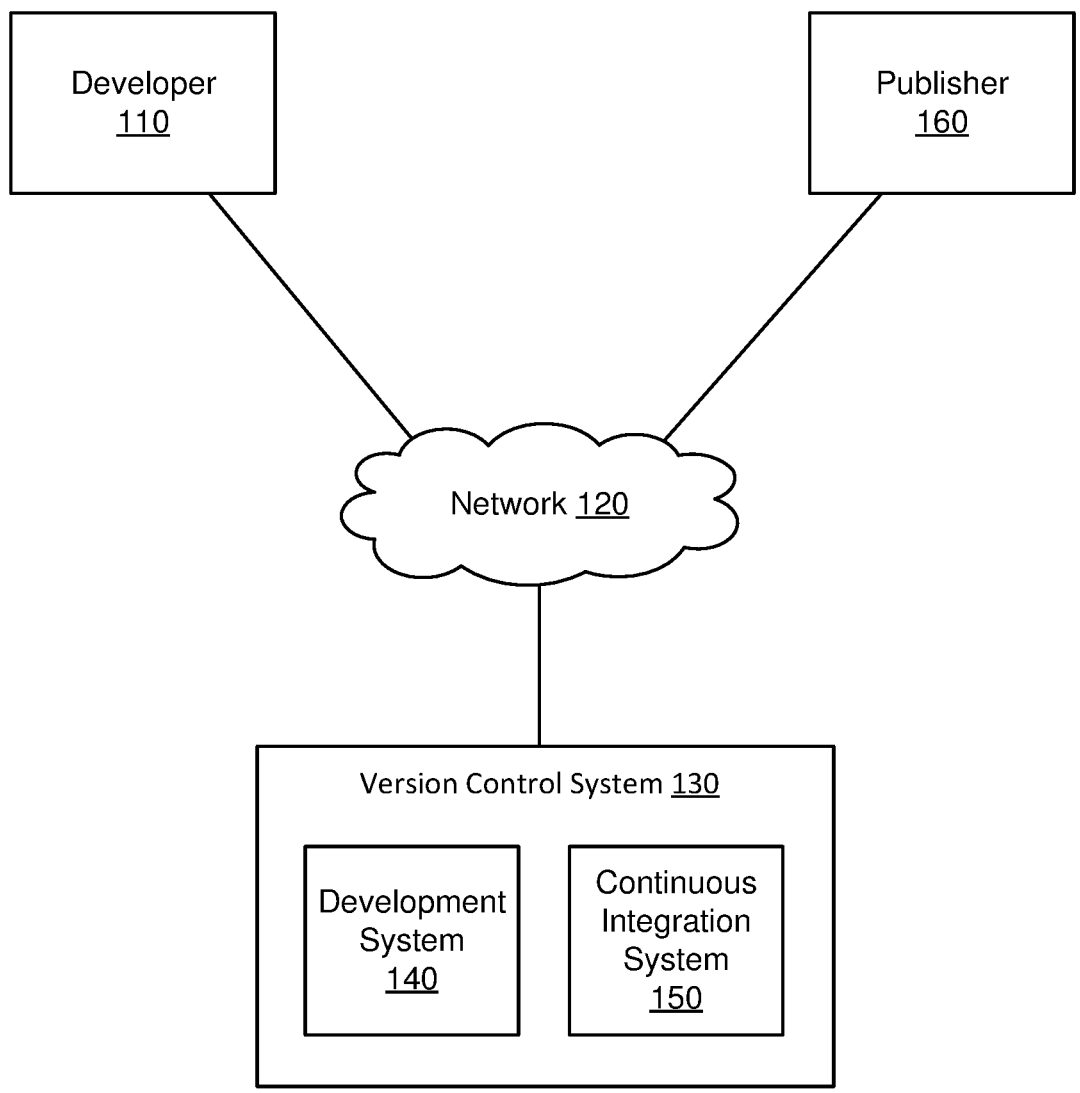
FIG. 1 is a high-level block diagram of a system environment for a version control system, in accordance with an example embodiment.

The figures may use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Version control software facilitates storage of past document versions as well as duplication of a document (e.g., source code for a software project) so that multiple content creators (e.g., developers) can make edits to a project simultaneously. Such duplication of a document by a version control system is sometimes referred to as "branching." This can be conceptualized as representing storage of subsequent document versions as nodes on a graph. A branch occurs when a copy of the version of the document stored at a particular node in the graph is duplicated, thus causing a split, or "branch" in the graph. New versions of the duplicated document may be stored along the new branch as changes are committed to the document on the new branch, i.e., as new versions of the duplicated document are saved to the new branch in the graph in parallel to new versions of the document along the original sequence of nodes in the graph. Version control software also supports merging document versions from multiple branches together. Various version control systems support different styles of branching and merging of document versions. As one example, the description herein uses examples related to a distributed version control system, but the system may be configured to be compatible with other branching version control system software. Furthermore, the versions stored at the branches are referred to herein as "document versions," however, a document version may refer to a single document or file, or a set of multiple documents or files, such as a software project, a project version, or a code base.

When teams of developers are working on a project together, it can be useful for them to agree ahead of time on what situations should prompt a branch of the document and when and how branches are going to be created and deleted. Thus, to coordinate the branching, an organization may establish a preferred workflow that describes the use cases for different types of branches on the version control system, e.g., with respect to a project. The description herein includes one example project management workflow and associated branch types, but a version control system may be configured to support many different workflows.

Typical workflows for logical branching and release management of document versions on a version control system are incompatible with development environments that require long release cycles. When a release branch from a long release cycle is merged into a master branch (e.g., for publication), bug fixes that were made at document versions on the release branch or at the master branch are not merged back into a development branch in a timely manner. In such cases, a most recent version of a code base or document may not be available at the development branch for further development.

The present system facilitates automatic merges from the release branch into the development branch when changes (e.g., bug fixes, hotfixes, etc.) are merged into the release branch or the master branch, thus keeping the document versions at the development branch current with respect to release and master branches without formally closing the release branch. Automation within a version control system environment that combines pull requests to a master branch with merges back into a development branch makes it more feasible to use a branching workflow process for developing and releasing projects within organizations that require long release cycles.

In an example embodiment, a project management workflow includes six branch types including a master (i.e., production) branch, a development branch, release branches, feature branches, hotfix branches, and bugfix branches. Examples using the six branches in the described project management workflow are shown in more detail at FIGS. 4A-4D.

The main branches of the workflow are the master branch and the development branch. The master branch and the development branch are always present on the system and are not to be deleted. Furthermore, changes are not committed by developers directly to the master branch or the development branch. Instead, changes to these branches are typically made via pull requests. A pull request occurs when an administrator, script, or other authorized party requests that a document version from one branch is merged into another branch.

The master branch contains the production-ready version of the documents and source code. For example, the master branch may host the published copy of a project, e.g., a live code base with features that are accessible to customers. New document versions that are added to the master branch are merged in from either release branches or hotfix branches. In various embodiments, and for certain projects, the master branch has restricted access such that only release managers or non-developers have authority to approve a merge of changes into the master branch.

The development branch is the branch that represents and stores a progression of latest development changes to a document version (e.g., a file, set of files, or software project). Sometimes also referred to as an "integration branch," the development branch typically contains the latest stable code. For example, the development branch may incorporate changes to various features of a code base from different developers such that all changes are merged into a single cohesive version at the development branch. Changes to the development branch are usually acquired as pull requests from a feature branch or as merges from release or hotfix branches. Since the development branch accumulates new features prior to their publication, the development branch often includes versions of the code that are newer than the code stored in the latest version on the master branch.

In addition to the two main branches, the example workflow includes supporting branches. Supporting branches include feature, release, bugfix, and hotfix branches. A supporting branch is created when it is needed for the project, and should be deleted once it is no longer needed. A developer works on changes to the project through the supporting branches.

A feature branch is generated by branching off a copy of a project version on the development branch. Developers typically work in feature branches. A developer makes changes to the document version at the feature branch, for example, changes to the code to incorporate a new feature. Feature branches may contain new features, bug fixes, and improvements. Multiple feature branches may be open simultaneously. This makes parallel development of features to a project by multiple developers possible. If a feature branch is open too long, it may miss updates that are made to the development branch. Thus, a developer can merge the latest changes from the development branch into an open feature branch to ensure that the feature branch will be compatible with changes made to the development branch while the feature is being written. Such manual merges to a feature branch by a developer during feature development can also ameliorate merge conflicts that may arise when the feature branch is ready to be merged back into the development branch. A feature branch is merged back into the development branch via a pull request from the development branch. After the feature branch has been merged back into the development branch, the feature branch is deleted. In some embodiments, this deletion is automated by the version control system.

The release branches are staging branches that permit the preparation of a new production release. A staging branch is a branch that is used for preparing a document for publication to the master branch. A release branch is generated as a copy of a version from the development branch. The release branch is for finalizing the code before moving it into production at the master branch. Developers can commit changes to the release branch through bugfix branches that branch off of the release branch, for example to fix bugs before publishing the document at the master branch. Typically, only bug fixes, configuration updates, documentation, or changes to presentation should be merged in a release branch and only one release branch should be opened at a time. In one embodiment, every update to a release branch is automatically merged back into the development branch to keep the development branch updated. When the content stored at the release branch is ready to be published, the release branch can be merged into the master branch. In one embodiment, the release branch is merged into the master branch using a pull request from the master branch. In one embodiment, the system includes an automated process that merges the release branch into the master branch and also merges the release branch back into the development branch, runs any necessary checks on the code prior to publication, tags the merge commit into the master branch with an appropriate version number, and deletes the release branch.

A bugfix branch is a branch that is generated as a branch off of an open release branch. Changes committed to a bugfix branch may include bug fixes, configuration changes, documentation updates, and presentation changes. In one embodiment, the system automates a process of merging the bugfix branch back into the release branch, indirectly merging the bugfix branch into the development branch, and deleting the bugfix branch.

A hotfix branch is a branch off of the master branch, used for quickly fixing issues within a project that has already been published. In some embodiments, a hotfix branch should be introduced while a release branch is also open, and only one hotfix branch should be opened at one time. This type of branch should be used only when needed, e.g., in the case of an emergency that requires quick fix to the master branch. Developers commit bug fixes, configuration, and presentation changes to the hotfix branch. After changes have been made to the code, the hotfix branch is merged back into the master branch and then deleted. In one embodiment, the system automates a process that runs any final checks on the contents of the hotfix branch, merges the changes into the master branch, merges the changes into an open release branch and into the development branch, and deletes the hotfix branch.

FIG. 1 is a high-level block diagram of a system environment for a version control system, in accordance with an example embodiment. FIG. 1 includes a developer 110, a network 120, a version control system 130, and a publisher 160. Alternate embodiments of the system environment can have any number of developers 110 and any number of publishers 160 as well as multiple version control systems 130. The functions performed by the various entities of FIG. 1 may vary in different embodiments.

The version control system 130 facilitates storage of document versions (e.g., software versions of source code for a software project that is in development, or tracked version changes in a text document) and simultaneously manages testing and publication of software versions that are ready for distribution. According to an example embodiment, the version control system 130 includes a development system 140 and a continuous integration system 150. Computer components such as web servers, network interfaces, security functions, load balancers, failover servers, management and network operations consoles, and the like are not shown so as to not obscure the details of the system architecture of the version control system 130. Additionally, the version control system 130 may contain more, fewer, or different components than those shown in FIG. 1 and the functionality of the components as described herein may be distributed differently from the description herein.

A content creator or content editor, such as a software developer, may interact with the version control system 130 through a developer 110. A developer 110 may be any computing device that can communicate document versions with the version control system 130. In various example embodiments, the developer 110 may be in the form of a server, desktop computer, laptop computer, or a personal or mobile computing device. A user developing content may use the developer 110 to interact with the development system 140 to generate new feature branches. A content creator can then make changes to the document at the developer 110 and save the changes to the feature branch hosted by the development system 140.

The publisher 160 is a system that provides a published document version to consuming systems, such as a system that installs or uses software associated with the document version. The publisher 160 may be any entity that can provide a document version for public or private release (e.g., a web server, software update manager, etc.). In various example embodiments, the publisher 160 may be in the form of a server, desktop computer, laptop computer, or personal or mobile computing device. In some embodiments, the latest version of a document stored on a master branch at the version control system 130 is provided to the publisher to be published. In one embodiment, the version control system 130 may be configured to act as the publisher 160 such that storing a document version to a master branch of the version control system 130 makes the document version available for use, e.g., by the public. In one example embodiment, the publisher 160 compiles a project based on a document version at the master branch of the version control system. Alternately, the continuous integration system 150 may compile a most recent document version at the master branch and provide a compiled version to the publisher 160 for distribution, such as for users to install the software version via the publisher 160.

The developer 110 and the publisher 160 can communicate with the version control system 130 via a network 120, which may comprise any combination of local area and wide area networks employing wired or wireless communication links. In some embodiments, all or some of the communication on the network 120 may be encrypted.

Figure 2:
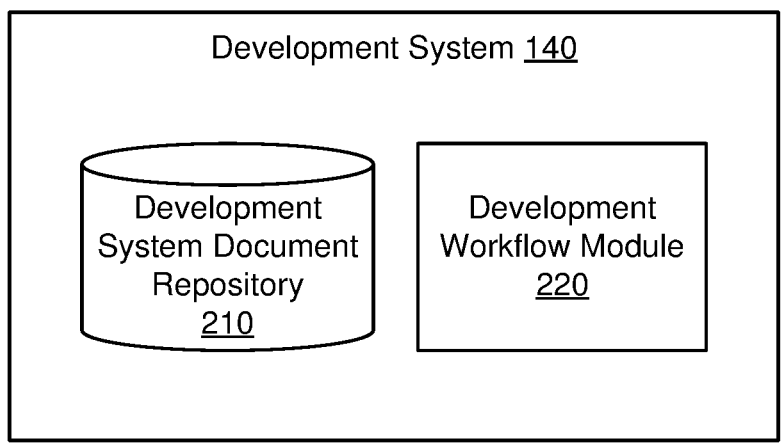
FIG. 2 is a high-level block diagram of a system architecture for the development system, in accordance with an example embodiment.

FIG. 2 is a high-level block diagram of a system architecture for the development system 140, in accordance with an example embodiment. The development system 140 includes various modules and data stores associated with content management, content creation, and feature development. The development system 140 comprises a development workflow module 220 and a development system document repository 210. Computer components such as web servers, network interfaces, security functions, load balancers, failover servers, management and network operations consoles, and the like are not shown so as to not obscure the details of the system architecture. Additionally, the development system 140 may contain more, fewer, or different components than those shown in FIG. 2 and the functionality of the components as described herein may be distributed differently from the description herein.

In one embodiment, the development system document repository 210 stores document versions associated with content creation and development. In particular, the development system document repository 210 stores document versions and other data used by the development system 140. That is, the development system document repository 210 may be a database that stores document versions for the development branch and feature branches of a project workflow on the version control system 130. The development system document repository 210 may also store metadata about the development branch and open feature branches. In some embodiments, the version control system 130 may store branch data, document versions, and other metadata separately or in different data stores outside of the development system 140.

The development workflow module 220 manages branches of the version control system 130 workflow that are associated with content creation and development. The development workflow module 220 facilitates storage of document versions at the development branch of a project workflow, for example, as stored in the development system document repository 210, and updates metadata related to the development branch when changes occur. The development workflow module 220 also facilitates creation, maintenance, and deletion of feature branches.

When the version control system 130 receives a request from a developer 110 to create a new feature branch, the development workflow module 220 generates the new feature branch, for example by duplicating the most recent document version stored at the development branch, or another document version stored at the development branch as requested by a content creator at the developer 110. Updates made by the content creator may then be saved by the development workflow module 220 as versions to the new feature branch. The content creator may submit a pull request to the development system 140 via the developer 110 when a document version at the new feature branch is ready to be merged into the latest document version at the development branch. The development workflow module 220 facilitates merging the document versions together and then deleting the feature branch.

Figure 3:
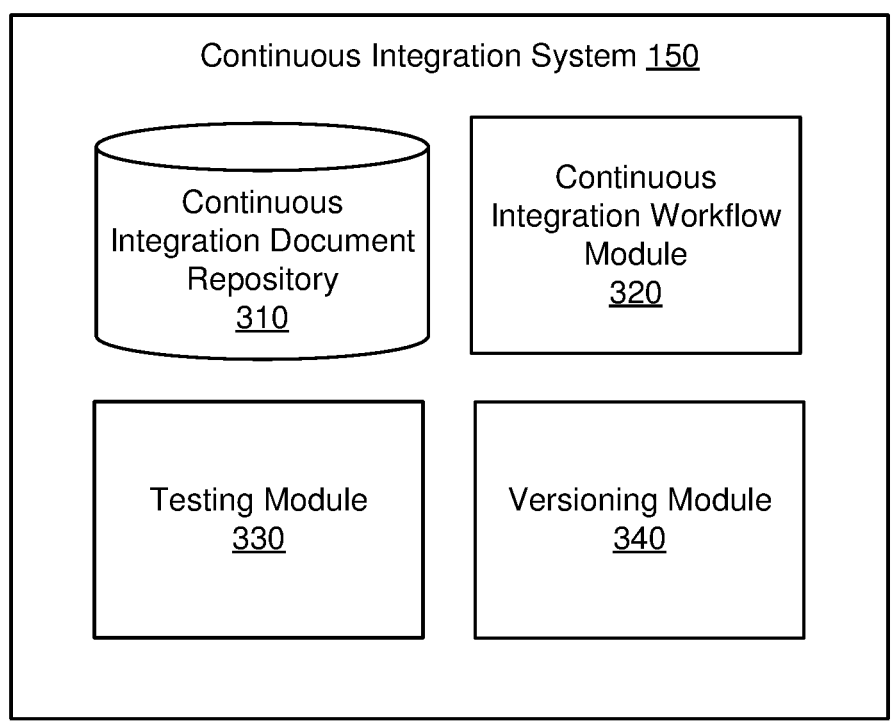
FIG. 3 is a high-level block diagram of a system architecture for the continuous integration system, in accordance with an example embodiment.

FIG. 3 is a high-level block diagram of a system architecture for the continuous integration system 150, in accordance with an example embodiment. The continuous integration system 150 includes various modules and data stores associated with content release, bug fixes, and publication. The continuous integration system 150 comprises a continuous integration document repository 310, a continuous integration workflow module 320, a testing module 330, and a versioning module 340. Computer components such as web servers, network interfaces, security functions, load balancers, failover servers, management and network operations consoles, and the like are not shown so as to not obscure the details of the system architecture. Additionally, the continuous integration system 150 may contain more, fewer, or different components than those shown in FIG. 3 and the functionality of the components as described herein may be distributed differently from the description herein.

In one embodiment, the continuous integration document repository 310 stores document versions associated with release preparations, bug fixes, quality assurance testing, and publication. The continuous integration document repository 310 stores document versions and other data used by the continuous integration system 150. That is, the continuous integration document repository 310 may be a database that stores document versions for the master branch, and various staging branches (i.e., release branches, bugfix branches, and hotfix branches) of a project workflow on the version control system 130. The continuous integration document repository 310 may also store metadata about the master branch and open staging branches. In some embodiments, the version control system 130 may store branch data, document versions, and other metadata separately or in different data stores outside of the continuous integration system 150.

The continuous integration workflow module 320 manages branches of the version control system 130 workflow that are associated with release testing, bug fixes, and publication. The continuous integration workflow module 320 facilitates publication of document versions to the master branch of a project workflow. The continuous integration workflow module 320 also generates new staging branches and stores the document versions and metadata for managing the staging branches in the continuous integration document repository 310, and updates metadata related to the master branch and staging branches when changes occur. The continuous integration workflow module 320 may also manage deletion of staging branches when they are no longer in use.

When a document version at the development system 140 is ready to be released, it is sent to the continuous integration system 150. In one embodiment, the continuous integration workflow module 320 generates a new release branch by duplicating the document version received from the development system 140. The new release branch may be used to track document versions as they are tested and updated in preparation for publication to the master branch.

In the process of preparing a document for publication to the master branch, the continuous integration workflow module 320 may generate bugfix branches by duplicating a document version from an open release branch so that a content creator can work on fixing any errors or other bugs in software code at the bugfix branch before merging the fixed document versions back into the release branch. When a pull request is sent to the continuous integration system 150 to merge a bugfix branch back into an open release branch, the continuous integration workflow module 320 also merges the document version from the bugfix branch into the release branch. Additionally, the continuous integration workflow module 320 sends the updated document version to the development system 140 where the development workflow module 220 merges the updated changes from the release branch into the development branch, e.g., as a new version of the development branch.

Similarly, the continuous integration workflow module 320 may generate a hotfix branch to fix errors found on a document version that has been published to the master branch. When a content creator needs to edit the document version at the published master branch, the continuous integration workflow modules 320 generates a new hotfix branch by duplicating the latest document version stored at the master branch. When a pull request is sent to the continuous integration system 150 to merge the hotfix branch back into the master branch, the continuous integration workflow module 320 merges the document version from the hotfix branch into the master branch and also merges the document version from the hotfix branch into an open release branch. When a hotfix branch is merged back into a release branch the updated version of the release branch is further merged back into the development branch, for example, by sending the updated version of the release branch to the development system 140 where the development workflow module 220 merges the updated changes from the release branch into the development branch.

Notably, in addition to generating and managing staging branches, the continuous integration workflow module 320 automates merging of updates to staging branches back into the development branch at the development system 140.

This may be done, for example, by executing a script that performs a document merge into the development branch whenever an update is made to a hotfix branch or a release branch. The automation of merging changes made at staging branches of the project workflow into the development branch ensure that the development branch receives edits made to a document version at the continuous integration system 150 and further ensures that the changes are received at the development branch in a timely manner. Thus, content creators working with feature branches that are based on a most recent version of a document from the development branch can incorporate bug fixes soon after the bug fix occurs even though the release branch may be open for a long release cycle. In some cases the continuous integration workflow module may detect merge conflicts between the updates to staging branches and the current state of a development branch. A merge conflict may occur when a change made from the content being merged back conflicts with changes that were made to the development branch (e.g., the same piece of code was updated in both branches and the system does not know which version to use). In some embodiments, the development system 140 resolves such conflicts by notifying a user associated with the development branch that a merge conflict has occurred so that the user can intervene manually to select the correct version.

The testing module 330 performs tests, such as unit tests and quality assurance tests on document versions to prepare the document for publication. In one embodiment, the testing module 330 tests document versions stored at an open release branch to determine whether the document version is ready to be merged into the master branch. If the testing module 330 identifies a bug or other issue in a document version at the release branch, the testing module 330 may trigger the continuous integration workflow module 320 to generate a bugfix branch so that a content creator can resolve the issue. In other embodiments, the testing module 330 may generate results of a test and a content creator or other authorized user may determine whether a bugfix branch should be opened based on the testing results. In some embodiments, the document version at a release branch may be tested at another system to determine whether changes are needed.

The versioning module 340 facilitates automatic versioning of document versions that are pulled into the master branch for publication. That is, the versioning module 340 may generate a version number or label for recording a publication to the master branch. In various embodiments, the versioning module 340 may additionally assign version labels to document versions stored at staging branches of the continuous integration system 150.

Figure 4A:
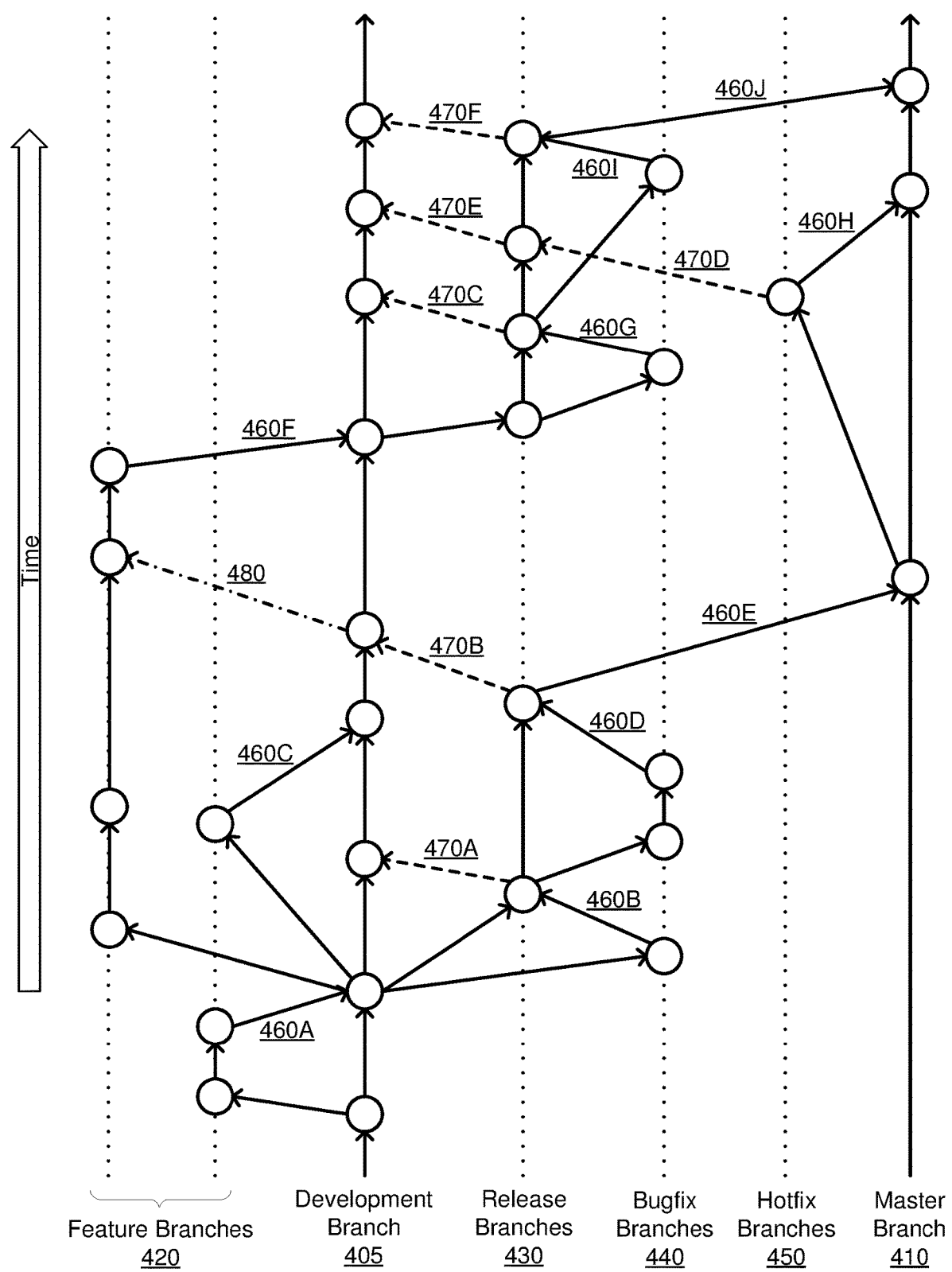
FIG. 4A illustrates an example implementation of a project workflow, in accordance with an embodiment.

FIG. 4A illustrates an example implementation of a project workflow, in accordance with an embodiment. Circles in the diagram represent the addition of new versions of a document to their respective branches. In some embodiments, a new version at a branch may be created whenever a part of the document is modified and saved to the version control system 130. In some embodiments, a new version, at a branch may be formally created, e.g., by developers who decide when a new version is warranted. Different organizations may configure the version control system 130 to generate a new version on a branch in response to certain conditions. Earlier document versions are represented by circles at the bottom of FIG. 4A and newer versions are represented by circles added further up a branch in the figure. The sparsely dotted vertical lines are labeled and presented to help visualize different branch categories and their progression over time.

FIG. 4A includes a development branch 405, a master branch 410, feature branches 420, release branches 430, bugfix branches 440, and hotfix branches 450. During the development process, one or more feature branches 420 may be generated from the development branch 405. Pull requests 460 (i.e., illustrated in FIG. 4A using arrows labeled with the reference numbers 460A-J) occur when a content creator or system script requests that a branch be merged into another branch, for example, when a version at a feature branch 420 is ready to be included in the document version at the development branch 405. In some situations, a content creator may request a manual update merge back 480 (shown by the irregularly dotted arrow) to incorporate changes that have been made to the development branch 405 into an open feature branch 420. The release branches 430 branch off from the development branch 405 and are merged into the master branch 410 when a document version from a release branch 430 is ready to be published. Bugfix branches 440 are used for changes to the document versions that are stored in the release branch. Hotfix branches 450 facilitate quick changes to a document version at the master branch 410.

The dotted arrows in FIG. 4A represent automated update mergebacks 470 (i.e., as labeled with reference numbers 470A-F) wherein the continuous integration system 150 merges changes to the master branch 410 or changes to a release branch 430 back into the development branch 405 whenever a change or update occurs. This keeps the development branch 405 current with respect to the master branch 410 and the release branches 430.

Figure 4B:
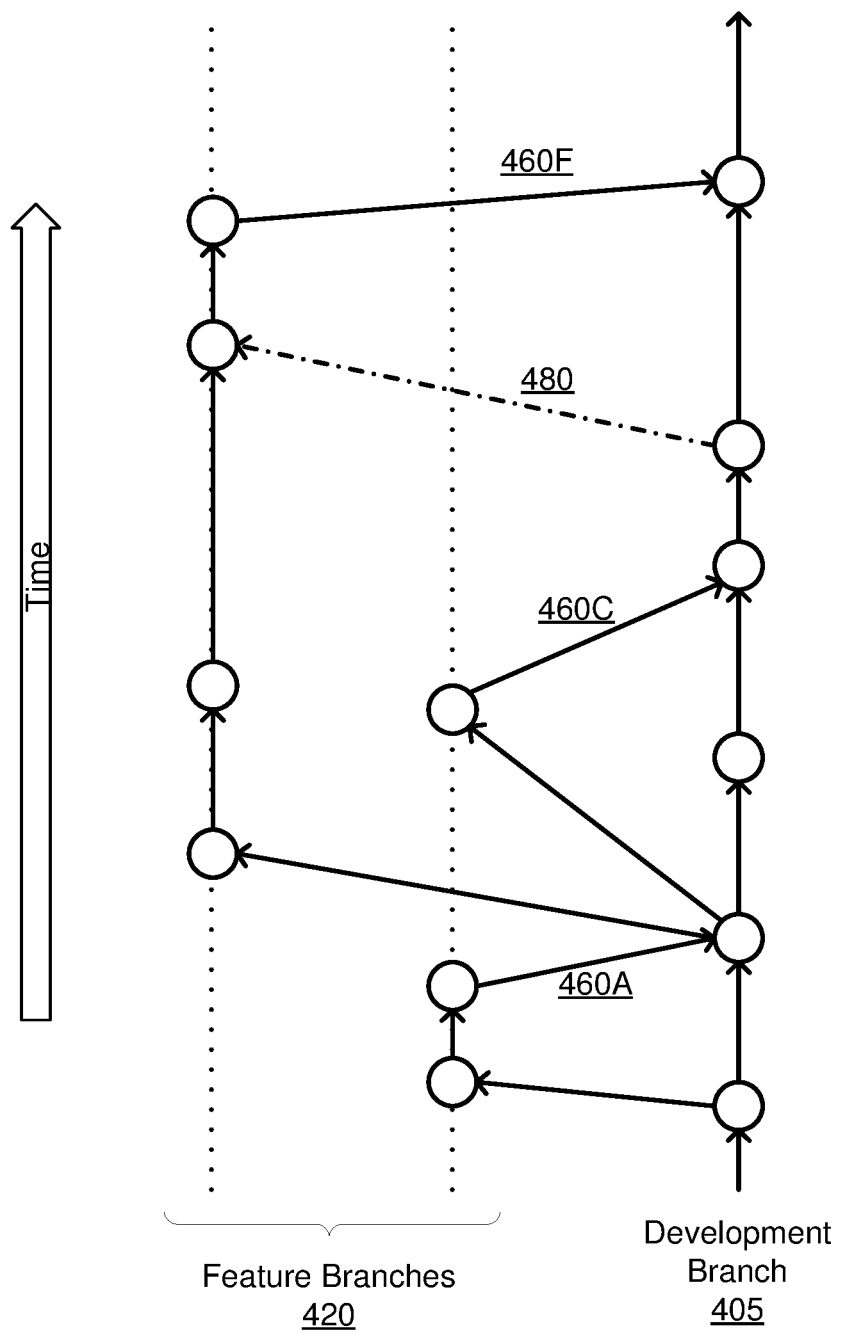
FIG. 4B illustrates a portion of the example implementation of a project workflow involving feature branches, in accordance with an embodiment.

FIG. 4B illustrates a portion of the example implementation of a project workflow involving feature branches, in accordance with an embodiment. FIG. 4B shows an example of three feature branches 420 that are generated from the development branch 405. As changes are made, new document versions may be added to a feature branch 420 separately from changes that are made to the development branch 405. On one of the example feature branches 420 shown in FIG. 4B, a manual update merge back 480 is performed, wherein a content creator working on the feature branch 420 requests that a more current version of the development branch 405 be merged into the working copy of the feature branch 420, for example so that features or bug fixes added to the development branch 405 versions after the feature branch 420 was created can be incorporated into the feature production. When a feature is ready to be merged into the development branch 405, a pull request 460 is used to request that the development system 140 merge in the added feature. For example, the first feature branch 420 to be opened in FIG. 4B includes two document versions at the feature branch 420 and then a pull request 460A is used to request that the changes made to the feature branch 420 be merged back into the development branch 405. Similarly, another feature branch 420 is merged back into the development branch 405 using a pull request 460C, and a third example feature branch 420 includes several document version updates before a pull request 460F is used to merge the changes back into the development branch 405. When a feature branch 420 is merged back into the development branch 405, the feature branch 420 is subsequently deleted.

Figure 4C:
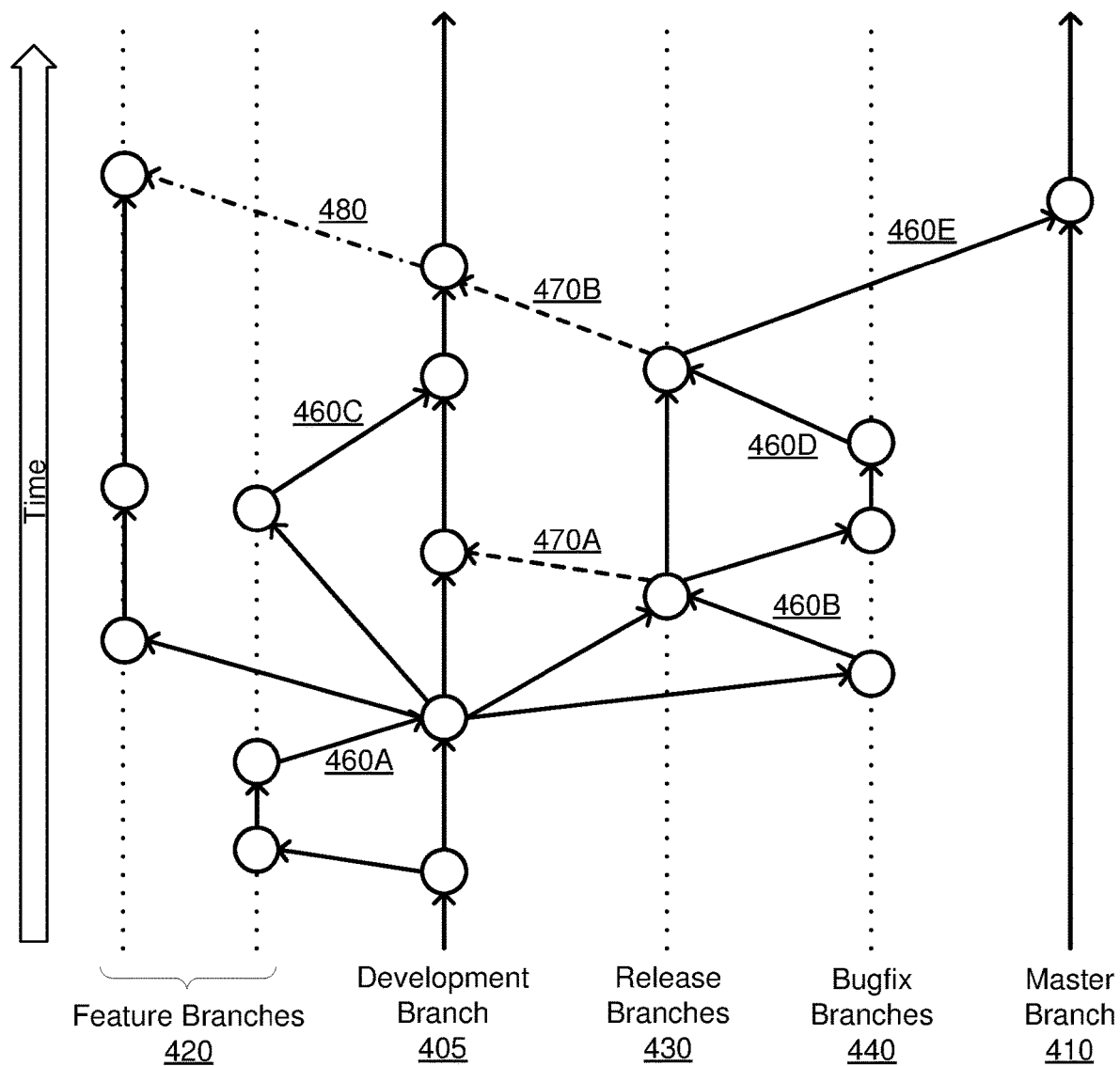
FIG. 4C illustrates a portion of the example implementation of a project workflow involving release branches and bugfix branches, in accordance with an embodiment.

FIG. 4C illustrates a portion of the example implementation of a project workflow involving release branches 430 and bugfix branches 440, in accordance with an embodiment. A release branch 430 is shown branching off the development branch 405. In the example, a bugfix branch 440 is also created based on the same version at the development branch 405. A change (e.g., to fix a bug) is made and then a pull request 460B prompts the continuous integration system 150 to merge the document version at the bugfix branch 440 into the open release branch 430. The continuous integration system 150 also performs an automated update mergeback 470A to incorporate the changes to the release branch 430 into the development branch 405. In the example of FIG. 4C, another bugfix branch 440 is opened and new document versions are created a the open bugfix branch to fix the bug. Another pull request 460D is used to prompt the continuous integration system 150 to merge the changes at the open bugfix branch 440 with the open release branch 430. In response merging the bugfix branch 440 back into the release branch 430, the continuous integration system 150 also performs an automated update mergeback 470B to merge the changes into the development branch 405. When a latest document version at the release branch 430 is ready for publication, a pull request 460E prompts the continuous integration system 150 to merge the document version from the open release branch 430 into the master branch 410, generating a new published document version.

Figure 4D:
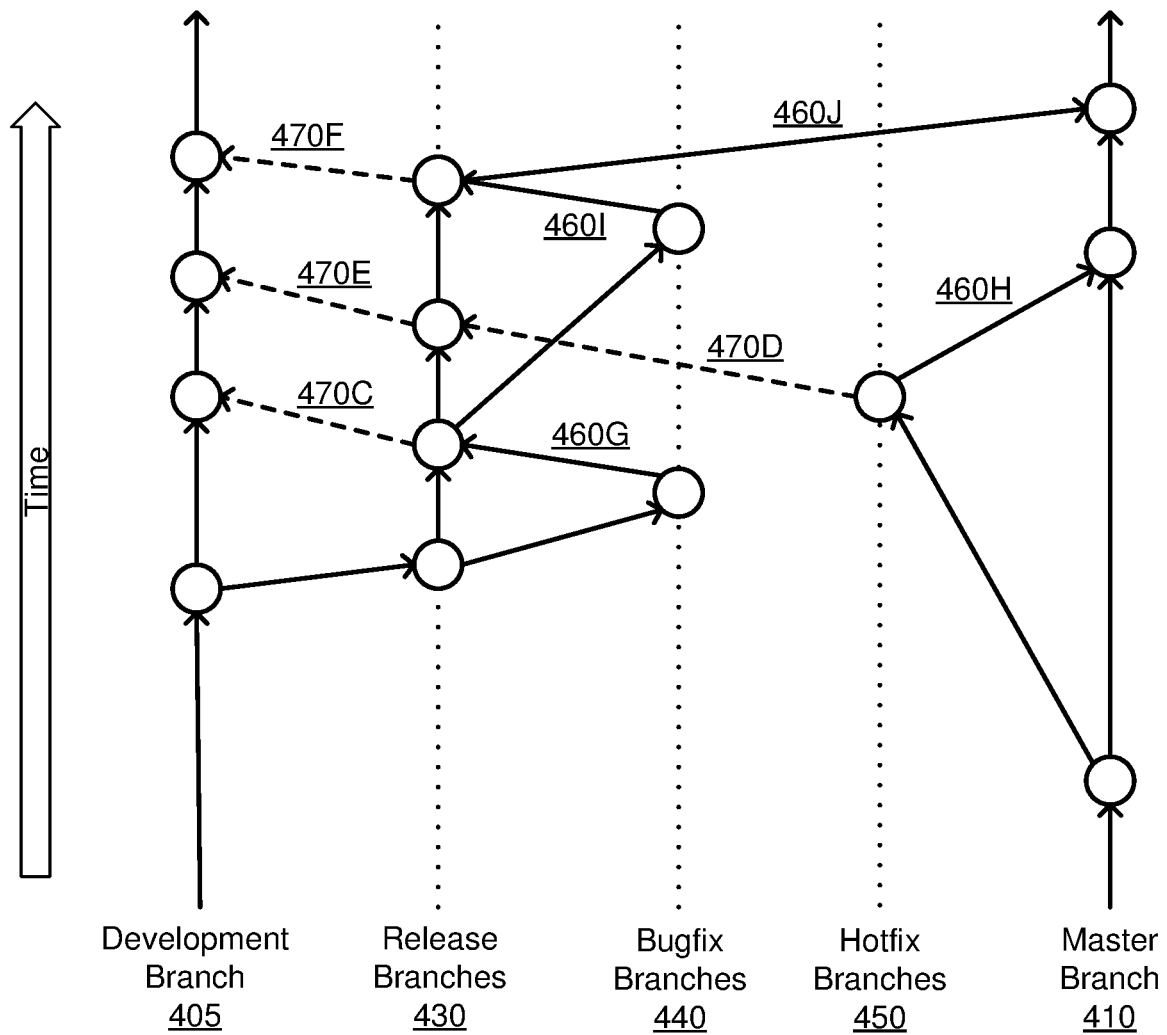
FIG. 4D illustrates a portion of the example implementation of a project workflow involving a hotfix branch, in accordance with an embodiment.

FIG. 4D illustrates a portion of the example implementation of a project workflow involving a hotfix branch 450, in accordance with an embodiment. An error, issue, or bug is discovered in the master branch 410. The continuous integration system 150, which already has a new open release branch 430, generates a hotfix branch 450 by duplicating the current document version at the master branch 410. The error, issue, or bug is fixed at the document version on the hotfix branch 450. A pull request 460H prompts the continuous integration system 150 to merge the updated hotfix branch 450 document version back into the master branch 410 and the continuous integration system 150 also performs an automated update mergeback 470D to merge changes made at the hotfix branch 450 into the release branch 430 and further performs another automated update mergeback 470E to merge the hotfix branch 450 changes as merged with the current release branch 430 document version into the development branch 405. In one embodiment, the pull request 460H also prompts the continuous integration system 150 to merge the updated hotfix branch 450 document version back into any open bugfix branches.

Figure 5:
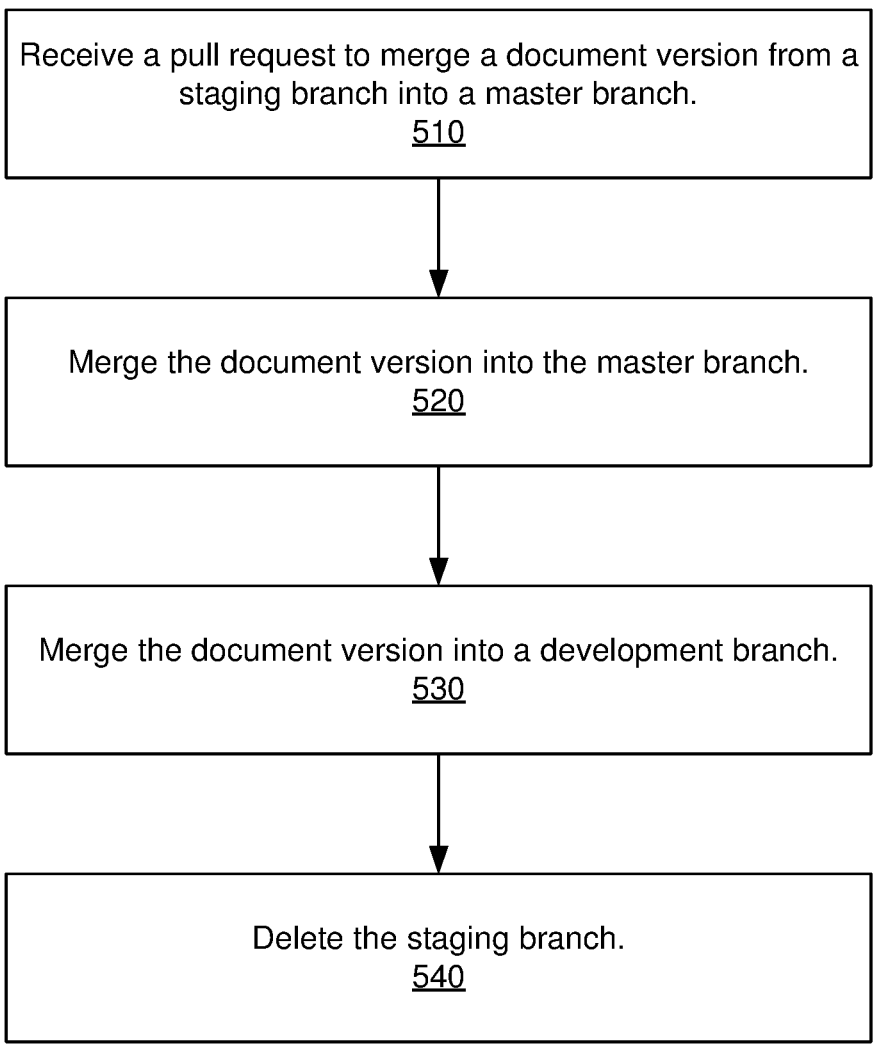
FIG. 5 is a flowchart illustrating a process for publishing a document version to a master branch of an example project workflow, in accordance with an embodiment.

FIG. 5 is a flowchart illustrating a process for publishing a document version to a master branch 410 of an example project workflow, in accordance with an embodiment. The continuous integration system 150 receives 510 a pull request to merge a document version from a staging branch (i.e., a release branch 430 or a hotfix branch 450) into a master branch 410. The continuous integration system 150 merges 520 the document version from the staging branch into the master branch 410, merges 530 the document version from the staging branch into a development branch 405, and deletes 540 the staging branch. In one embodiment. The merging and deletions are completed by executing a script including the appropriate commands.

Figure 6:
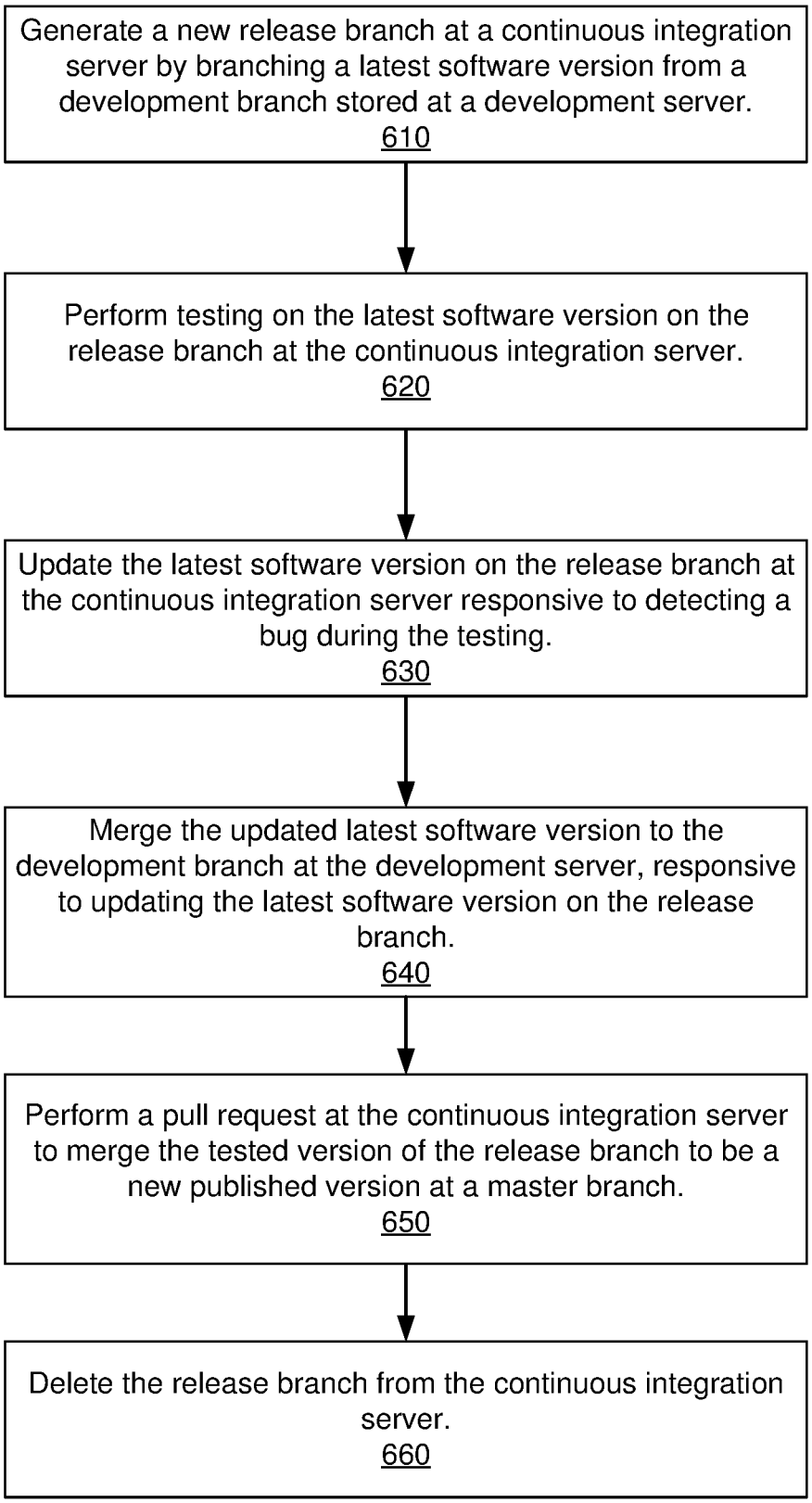
FIG. 6. is a flowchart illustrating a process involving generating a release branch and testing software versions stored at the release branch for publication, in accordance with an example embodiment.

FIG. 6. is a flowchart illustrating a process involving generating a release branch and testing software versions stored at the release branch for publication, in accordance with an example embodiment. In FIG. 6, document versions are referred to as software versions for the sake of example, however, the illustrated process may be used on a variety of document versions.

The continuous integration system 150 generates 610 a new release branch by branching a latest software version from a development branch 405, e.g., as stored at the development system 140. The continuous integration system 150 performs 620 testing on the latest software version on the release branch 430. Responsive to detecting a bug during the testing, the continuous integration system 150 updates 630 the latest software version on the release branch 430.

Responsive to updating the latest software version on the release branch (e.g., via generation of a bugfix branch to fix the error and a pull request to merge the bugfix branch back into the release branch), the continuous integration system 150 merges 640 the updated latest document version to the development branch at the development system 140. The continuous integration system 150 also performs 650 a pull request to merge the tested version of the release branch 430 to be a new published version at a master branch 410. Once the release branch 430 version of the document is merged into the master branch 410 for publication, the continuous integration system 150 deletes 660 the release branch.

Figure 7:
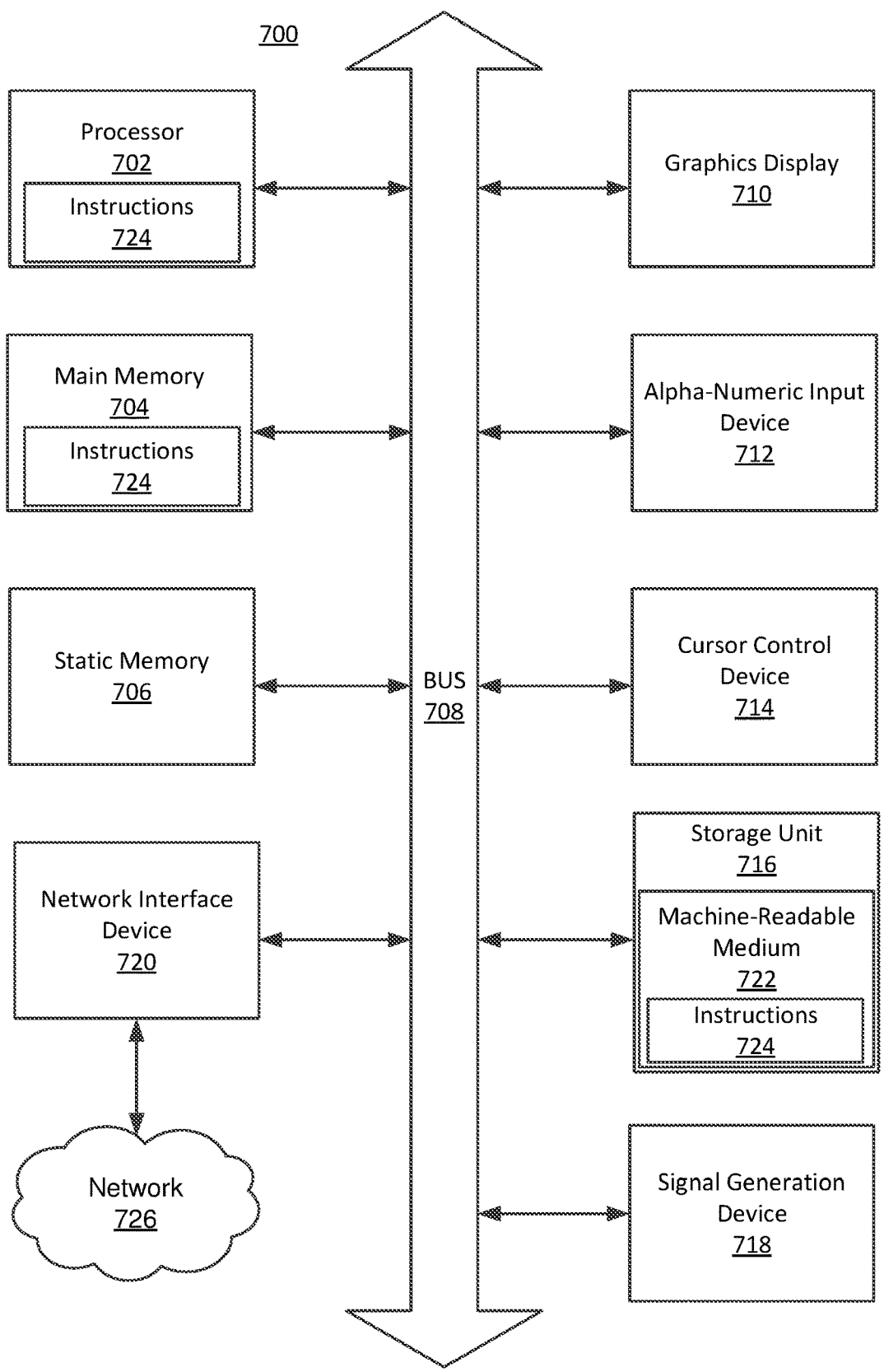
FIG. 7 is a block diagram illustrating components of an example machine able to read instructions from a machine-readable medium and execute them in one or more processors.

FIG. 7 is a block diagram illustrating components of an example machine able to read instructions from a machine-readable medium and execute them in one or more processors (or controllers). Specifically, FIG. 7 shows a diagrammatic representation of the version control system 130 in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the development system 140 and the continuous integration system 150. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726, such as the network 120, via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer system comprising:
one or more computer processors for executing computer program instructions; and
a non-transitory computer-readable storage medium storing instructions executable by the one or more computer processors to perform steps on a development server and a continuous integration server comprising:
generating a feature branch at the development server by branching a latest software version from a development branch stored at the development server;
updating the software version on the feature branch with changes to a development code that are received at the development server;
performing a pull request at the development server to pull the updated version of the feature branch to be a new version at the development branch;
deleting the feature branch from the development server;
generating a release branch at the continuous integration server by branching a latest software version from the development branch stored at the development server;
performing testing on the latest software version on the release branch at the continuous integration server;
updating the latest software version on the release branch at the continuous integration server responsive to detecting a bug during the testing;
responsive to updating the latest software version on the release branch at the continuous integration server, merging the updated latest software version to the development branch at the development server;
performing a pull request at the continuous integration server to pull the tested version of the release branch to be a new published version at a master branch; and
deleting the release branch from the continuous integration server.

2. The computer system of claim 1, wherein updating the latest software version on the release branch at the continuous integration server responsive to detecting a bug during the testing comprises:
generating a bugfix branch at the continuous integration server by branching a latest software version from the release branch stored at the continuous integration server;
updating the software version on the bugfix branch with changes that address the detected bug;
performing a pull request at the continuous integration server to pull the updated software version on the bugfix branch to be a new version at the release branch; and deleting the bugfix branch from the continuous integration server.

3. The computer system of claim 1, the steps further comprising:
  detecting a bug in the new software version at the master branch;
  generating a hotfix branch at the continuous integration server by branching the new software version from the master branch;
  updating the software version at the hotfix branch to address the detected bug;
  performing a pull request at the continuous integration server to pull the updated software version on the hotfix branch to be a new version at the master branch;
  responsive to performing the pull request to pull the updated software version on the hotfix branch to be a new version at the master branch:
    merging the updated software version of the hotfix branch to be a new version at the development branch at the development server; and
    deleting the hotfix branch from the continuous integration server.

4. The computer system of claim 3, wherein merging the updated software version of the hotfix branch to the development branch at the development server comprises:
  merging the updated software version of the hotfix branch to be a new version of an open release branch; and
  merging the new version of the open release branch to be the new version at the development branch.

5. The computer system of claim 1, wherein interactions with the branches comprise execution of one or more version control system commands.

6. The computer system of claim 1, wherein performing testing on the latest software version comprises performing a set of quality assurance tests.

7. The computer system of claim 1, wherein pulling the tested version of the release branch to be a new published version at a master branch comprises generating and assigning a version label to the new published version.

8. A computer-implemented method for publishing code performed by a system including a development server and a continuous integration server, the method comprising:
  generating a feature branch at the development server by branching a latest software version from a development branch stored at the development server;
  updating the software version on the feature branch with changes to a development code that are received at the development server;
  performing a pull request at the development server to pull the updated version of the feature branch to be a new version at the development branch;
  deleting the feature branch from the development server;
  generating a release branch at the continuous integration server by branching a latest software version from the development branch stored at the development server;
  performing testing on the latest software version on the release branch at the continuous integration server;
  updating the latest software version on the release branch at the continuous integration server responsive to detecting a bug during the testing;
  responsive to updating the latest software version on the release branch at the continuous integration server, merging the updated latest software version to the development branch at the development server;
  performing a pull request at the continuous integration server to pull the tested version of the release branch to be a new published version at a master branch; and
  deleting the release branch from the continuous integration server.

9. The computer-implemented method of claim 8, wherein updating the latest software version on the release branch at the continuous integration server responsive to detecting a bug during the testing comprises:
  generating a bugfix branch at the continuous integration server by branching a latest software version from the release branch stored at the continuous integration server;
  updating the software version on the bugfix branch with changes that address the detected bug;
  performing a pull request at the continuous integration server to pull the updated software version on the bugfix branch to be a new version at the release branch; and
  deleting the bugfix branch from the continuous integration server.

10. The computer-implemented method of claim 8, further comprising:
  detecting a bug in the new software version at the master branch;
  generating a hotfix branch at the continuous integration server by branching the new software version from the master branch;
  updating the software version at the hotfix branch to address the detected bug;
  performing a pull request at the continuous integration server to pull the updated software version on the hotfix branch to be a new version at the master branch;
  responsive to performing the pull request to pull the updated software version on the hotfix branch to be a new version at the master branch:
    merging the updated software version of the hotfix branch to be a new version at the development branch at the development server; and
    deleting the hotfix branch from the continuous integration server.

11. The computer-implemented method of claim 10, wherein merging the updated software version of the hotfix branch to the development branch at the development server comprises:
  merging the updated software version of the hotfix branch to be a new version of an open release branch; and
  merging the new version of the open release branch to be the new version at the development branch.

12. The computer-implemented method of claim 8, wherein interactions with the branches comprise execution of one or more version control system commands.

13. The computer-implemented method of claim 8, wherein performing testing on the latest software version comprises performing a set of quality assurance tests.

14. The computer-implemented method of claim 8, wherein pulling the tested version of the release branch to be a new published version at a master branch comprises generating and assigning a version label to the new published version.

\* \* \* \* \*